(No Model.)
D. STOUT.
AERIAL SHIP.
No. 319,936. Patented June 9, 1885.
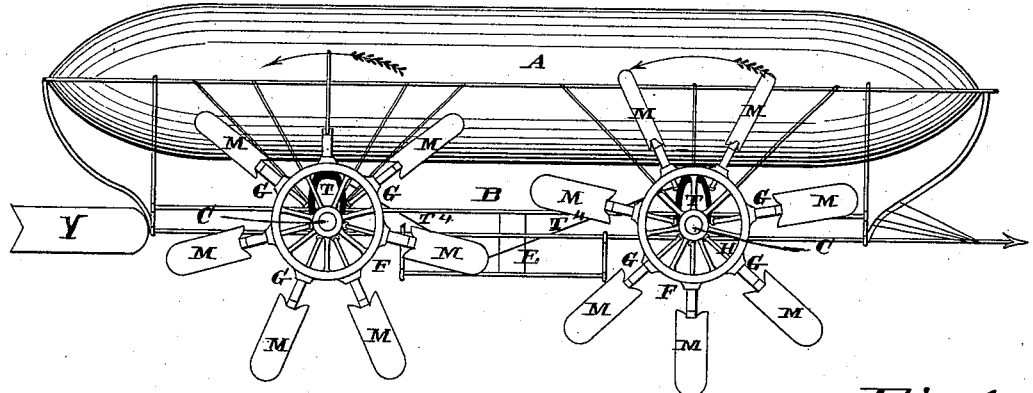
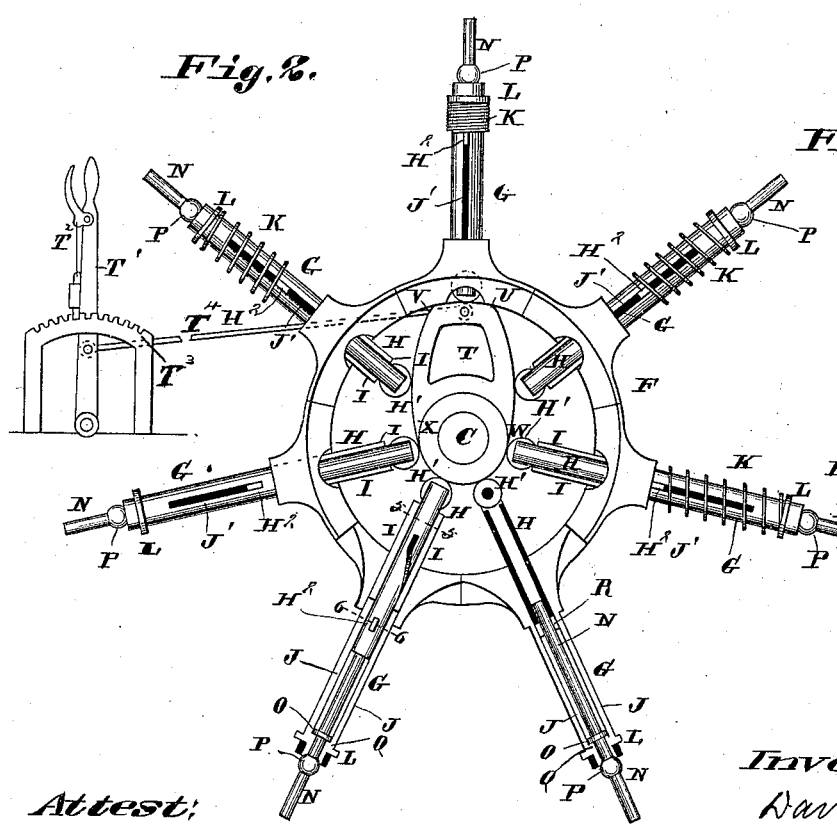
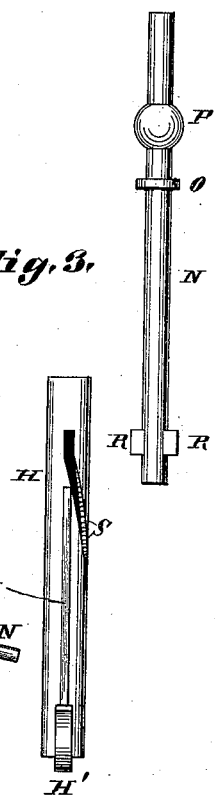
Attest:
Geo. D. Whitlock
Victor A. Lewis
Inventor;
David Stout
By Knight Bros
Attys

UNITED STATES PATENT OFFICE.

DAVID STOUT, OF ST. LOUIS, MISSOURI.

AERIAL SHIP.

SPECIFICATION forming part of Letters Patent No. 319,936, dated June 9, 1885.

Application filed October 18, 1884. (No model.)

*To all whom it may concern:*

Be it known that I, DAVID STOUT, of the city of St. Louis, in the State of Missouri, have invented a certain new and useful Improvement in Aerial Ships, of which the following is a full, clear, and exact description, reference being had to the accompanying drawings, forming part of this specification, and in which—

Figure 1 is a side elevation of my improved ship. Fig. 2 is an enlarged detail view of one of the wheels and means for adjusting the cam. Fig. 3 is an enlarged view of one of the sleeves removed. Fig. 4 is a similar view of the inner end of one of the wings. Fig. 5 is a transverse section taken on line 5 5, Fig. 2; and Fig. 6 is a similar view taken on line 6 6, Fig. 2.

My invention relates to an improved aerial ship; and it consists in features of novelty hereinafter fully described, and pointed out in the claims.

Referring to the drawings, A represents a balloon of suitable shape and construction, and depending from which is a frame, B, having shafts or axles C journaled to it, to which are secured wheels D, turned by an engine, E, or other motive power, supported on the frame B. The wheels are rigidly secured to the shafts or axles, so as to turn with them, and each of them is constructed and operated as follows:

F represents the body of one of the wheels, having hollow extensions G, within which fit sleeves H, having lugs or feathers I, that fit and work in grooves or slots J of the extensions G. The sleeves are forced inward by spiral springs K, that surround the extensions G, between collars L on the outer ends of the extensions and the lugs or feathers $H^2$ on the sleeves fitting in slots J in the extensions.

M represents wings having stems N, that fit within the extensions G and sleeves H, being held from end movement by collars O P, inside and outside of shoulders Q on the outer ends of the extensions. (See Fig. 2.) The stems have lugs R, that fit in spiral grooves S in the sleeves. It will thus be seen that, as the wheels revolve and the sleeves are forced outward by cams T, surrounding the shaft C, the wings will be feathered while the sleeves are bearing upon the parts of the cam between the letters U and V, Fig. 2, the grooves S being sufficiently spiral to cause the wings to turn one-fourth of a revolution while the sleeves are bearing on the cam between the points marked W and U, and then the wings turn back the one-fourth of a revolution as the sleeves are bearing upon the part of the cam between the points marked V and X, the sleeves being forced inward by the springs K.

The cams are not secured to the shafts, but are loose on them, and are held to any adjustment by any suitable means.

I have shown a lever, T', with pawl $T^2$, a rack, $T^3$, and rods $T^4$, connecting the cams to the lever. By changing the position of the cams the wings will be made to feather sooner or later, as desired, to cause a greater or less upward or downward movement to the ship, or to cause it to move forward on a horizontal line. The rack $T^3$ is secured to the frame B.

Y represents a rudder at the rear end of the ship, by which it can be guided at will.

The sleeves are preferably provided with friction-rollers H', as shown.

I claim as my invention—

1. In an aerial ship, the combination of a balloon, a frame secured to the balloon, shafts or axles mounted in the frame, cams supported around the shafts or axles, and wheels, each wheel comprising a body, hollow radial extensions having grooves or slots, sleeves sliding in the extensions, bearing on a cam and formed with lugs and spiral slots, springs to force the sleeves inward, and wings having stems formed with lugs occupying the spiral slots, substantially as set forth.

2. In an aerial ship, the combination of a balloon, a frame secured to the balloon, shafts or axles mounted in the frame, cams adjustable around the shafts or axles, devices by which the cams are adjusted, and wheels, each wheel comprising a body, hollow radial extensions having grooves or slots, sleeves formed with spiral slots, and lugs occupying the grooves or slots in the extensions, springs to force the sleeves inward, and wings having stems formed with lugs occupying the spiral slots, substantially as set forth.

3. In an aerial ship, the wheels consisting each of a body having hollow extensions, sleeves having lugs fitting in slots in the extensions, and wings having stems provided with lugs fitting in spiral grooves in the sleeves, in combination with cams for forcing the sleeves outward and springs for forcing them inward, substantially as and for the purpose set forth.

4. An aerial ship-wheel consisting of a body having hollow extensions, sleeves having lugs fitting in slots in the extensions, and wings having stems provided with lugs fitting in spiral grooves in the sleeves, substantially as set forth.

DAVID STOUT.

In presence of—
  GEO. H. KNIGHT,
  SAML. KNIGHT.